Dec. 24, 1968　　　　　　　M. LUDWIG　　　　　3,417,776
RELIEF VALVE SYSTEM FOR VESSELS UNDERGOING
INTERMITTENT EXPLOSIONS
Filed July 16, 1964　　　　　　　　　　　　2 Sheets-Sheet 1

INVENTOR
MILTON LUDWIG
BY
ATTORNEYS

Dec. 24, 1968

M. LUDWIG 3,417,776

RELIEF VALVE SYSTEM FOR VESSELS UNDERGOING
INTERMITTENT EXPLOSIONS

Filed July 16, 1964

INVENTOR
MILTON LUDWIG

BY *J. E. Johnston*
*George W. Wasson*
ATTORNEYS

United States Patent Office 3,417,776
Patented Dec. 24, 1968

3,417,776
RELIEF VALVE SYSTEM FOR VESSELS UNDERGOING INTERMITTENT EXPLOSIONS
Milton Ludwig, Berkeley, Calif., assignor to Chevron Research Company, a corporation of Delaware
Filed July 16, 1964, Ser. No. 383,195
1 Claim. (Cl. 137—512.5)

This invention relates to pressure relief systems. It relates particularly to a spheridal relief valve system for relieving intermittent pressure changes created by explosions within hydrocarbon-conversion vessels and the like, and has particular utility in alleviating pressure changes in vessels used in the production of phthalic anhydride by the controlled oxidation of hydrocarbons such as orthoxylene.

It is an object of the present invention to provide a pressure relief system having: (1) high reliability; (2) high reaction and recovery sensitivity; (3) high capacity; (4) low fabrication, operating and maintenance costs; and (5) quiet operation; by the use of a spherical relief valve system attached to a vessel used in an explosion-prone process. The valves of the type herein disclosed are provided with a pressurized environment separated from the atmosphere by means of a sealable cover member also attached to the head of the vessel. By this arrangement ultrafast relief of pressure created by explosions within the vessel can be achieved in a reliable economical manner without disrupting the operation of the vessel.

Explosions occur in the production of many volatile compounds but are especially prevalent in those processes involving the oxidation and conversion of hydrocarbons at elevated temperatures, It is customary in carrying out these processes to design the conversion vessels to have pressure relief systems operative by pressure created by explosions within the vessel. Heretofore, designers and engineers have used either bursting disc or spring-loaded plate relief systems for relieving vessels used in explosion-prone processes, but each type of system suffers from serious limitations such as excessive noise, high cost, low reliability, slow response, and need for replacement after each explosion.

In accordance with the present invention, the foregoing problems are eliminated by utilizing a lightweight spherical relief valve system for vessels used in processes undergoing intermittent explosions. In accordance with one aspect of the invention the valving syestem comprises a system of spherical relief valves including hollow balls arranged in valve seats in a base plate attached to or integrally formed with an internal head of the conversion vessel. The hollow balls are held in the valve seats by positive pressure provided by a connection to the feed line of the process, or by a separate pressure system including a compressor and control valves. In operation, the low inertia of the hollow balls makes it possible for the differential pressure between the lower and upper side of the valve to lift the valve very rapidly and relieve the explosion-created pressure quickly and quietly, yet permitting the balls to return to a normally closed position without unduly disrupting the operation of the conversion process in the vessel.

In another aspect of the invention, control of the pressure system exterior of the vessel operating on the balls of the valving system provides high operational reliability in adjusting operating criteria as slight variations in operating pressure occur without necessitating redesign of the relief system.

Other objects and features of the invention will become more apparent after consideration of the following description of one embodiment of the invention taken in conjunction with the following drawings wherein.

Figure 1:
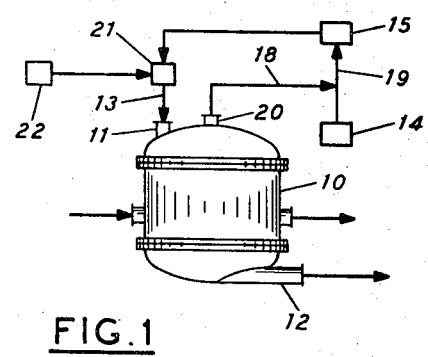
FIGURE 1 is a flow diagram, partially schematic, of a process wherein a vessel is employed that may be adapted with a relief valve system of the present invention.
Figure 2:
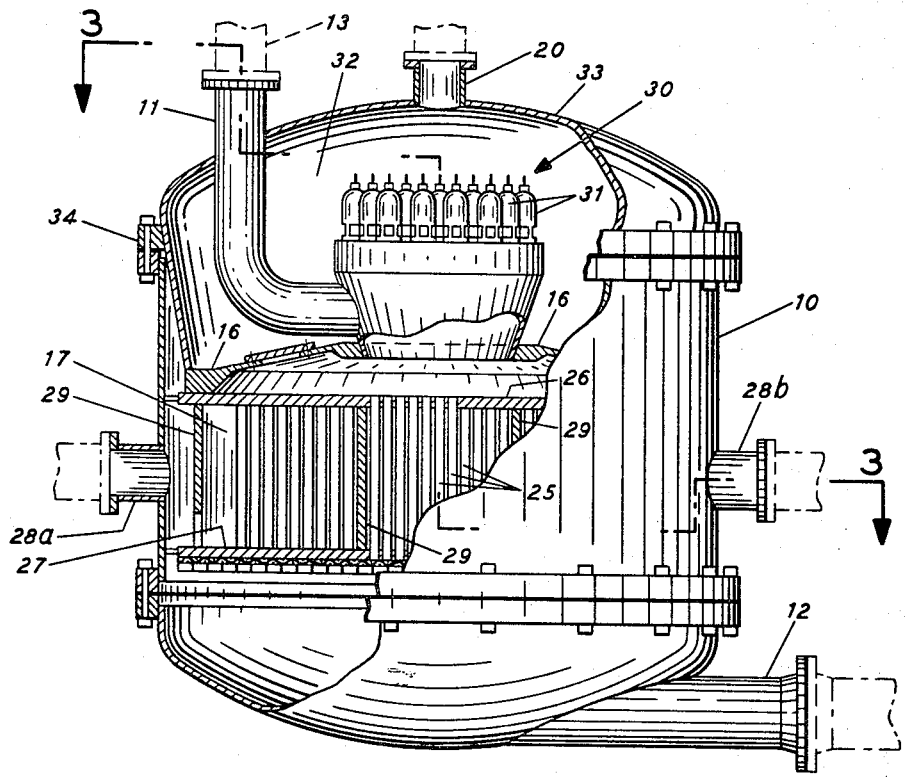
FIGURE 2 is a side view, partially cut away, of a vessel of a type useful in the process of FIGURE 1 illustrating a relief system for relieving the vessel of explosion-created pressure.
Figure 3:
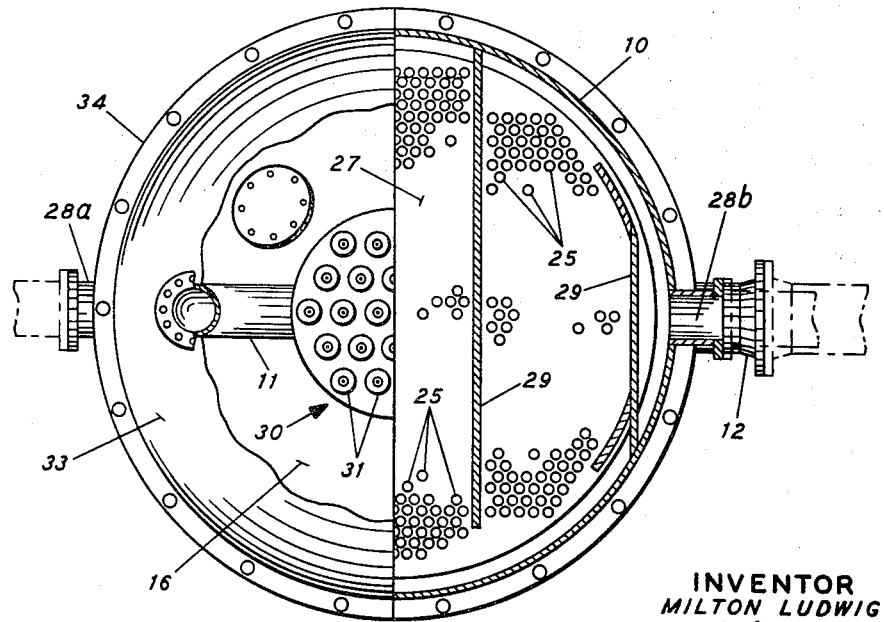
FIGURE 3 is a sectional view taken along line 3—3 of FIGURE 2.

FIGURE 1 illustrates, in flow diagram form, a process including a vessel 10 wherein the pressure relief system embodying the invention may be employed. In the vessel 10 a process such as the oxidation of orthoxylene to phthalic anhydride may be in progress. Vessel 10 includes an inlet 11 and an outlet 12. In the suggested process, the inlet 11 connects to sources of air and orthoxylene by way of feed line 13. The air emanates from high-pressure blower 14 and is heated to approximately 300° F. by preheater 15 prior to entry into the vessel. The orthoxylene is mixed with the air in stoichiometric proportions of approximately 17:1 at atomizer 21 from a source generally indicated at 22. Referring now to FIGURES 2 and 3, after the mixture passes through the inlet 11 the temperature of the mixture is increased to approximately 1050° F. within reaction zone 17 of the vessel wherein the orthoxylene is oxidized to vaporized phthalic anhydride in the presence of a vanadium oxide catalyst. The catalyst is located in the reaction zone within tube members 25 connected to tube sheets 26 and 27. The phthalic anhydride is exhausted through outlet 12. The interior of the vessel is maintained at a proper reaction temperature by means of a heat exchange medium such as molten salt passing transversely through the vessel by way of inlet 28a and outlet 28b. The salt is confined within the vessel by baffles 29 and tube sheets 26 and 27.

Experience has shown that the mixture of air and orthoxylene sometimes accumulates in an explosive mixture between tube sheet 26 and internal head 16 of the vessel. If an explosion occurs within this zone, i.e., burning of the mixture at a rapid but finite rate, the pressure rises rapidly throughout the vessel. To relieve the explosion pressure in the portion of the vessel below the internal head, a pressure relief system is conveniently attached to the internal head 16. As discussed above, however, conventional relief systems to the atmosphere may not react fast enough, may be too noisy, or uneconomical for effective in-plant operations.

Figure 4:
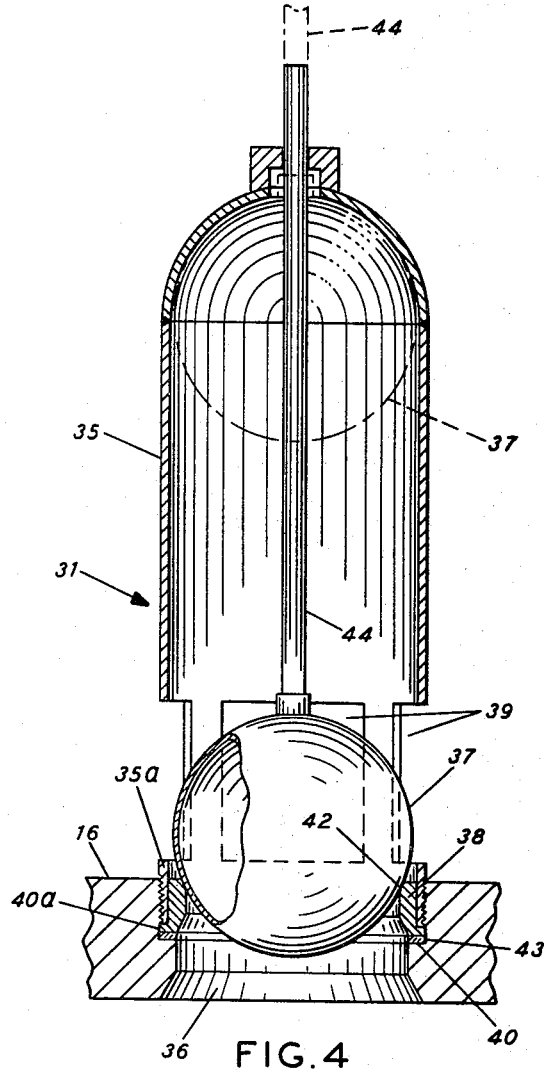
FIGURE 4 is an enlarged detail drawing of a spherical relief valve incorporated within the relief system of FIGURES 2–3.

As distinguished from previously known techniques, the present invention permits rapid relief of closed vessels containing processes subject to intermittent explosions in an economical and quiet manner. The relief system is designated 30 in FIGURES 2 and 3 and is more specifically shown in FIGURE 4.

As shown in FIGURE 2, relief sytsem 30 attaches to the raised central portion of head 16 and includes a plurality of spherical relief valves 31 subjected to a pressurized gas medium, usually air, within a chamber 32. The purpose of the pressurized gas is to provide a net downward force on the valves during normal operation of the vessel yet as explosion-created pressure rises within the vessel, offer no consequential resistance to the opening of the valves to relieve the vessel. Frustoconical cover member 33 attaches to the upper skirt of the vessel at flange 34 to form the side and end walls of chamber 32. The remaining side of the chamber is formed by the head 16.

Each valve 31 includes a valve cage 35 attached to the head 16 in alignment with an opening 36. The valve cage acts as a guide for hollow sphere 37 and is provided with a bore and a series of slots 39 in its side wall. The slots serve as passageways for the flow of gases from the interior of the vessel when the hollow sphere 37 travels to an open position as shown in phantom in FIGURE 4. Hollow sphere 37 is adapted to seat on annular seating element 38 during normal operation of the vessel. The upper surface of the ball is subjected to the pressures within the chamber 32. The seating element 38 is disposed against shoulder 40 formed at the junction of counterbore 40$a$ with opening 36 and is retained in the counterbore by the threaded end 35$a$ of the ball cage 35. Upper surface 42 of the seating element is formed into a frustrum of a cone to provide a continuous line contact with the hollow sphere 37 when the lower portion of the latter is seated in contact with surface 42. A resilient gasket 43 is seated between shoulder 40 and the seating element 38 to prevent leakage during normal operation of the vessel. A guide 44 attaches to each valve ball to prevent rotation of the valve ball during travel along the bore of the ball cage 35. It is noted that diameter of the cage relative to the diameter of the ball can be chosen to cushion upward travel of and consequently prevent mechanical damage to the ball.

While configurations other than hollow spheres 37 may be used, a hollow ball is preferred so that its lightness, with corresponding mechanical ruggedness, minimizes its inertia during operation. As an explosion occurs, the sphere travels upward from the seating element 38 to the end wall of sphere cage 35. Inasmuch as the resistance of the gas with the chamber 32 approaches zero, the time required for each sphere to lift from the seating element is minimum. As the explosion pressure is exhausted by way of slots 39, the sphere returns, by gravity, in a fraction of a second to a position in contact with the seating element.

The magnitude of the pressure above the valve balls varies with operating conditions but preferably is set as close as possible to the operating pressure within the vessel 10 to minimize the time for the spheres to lift from the seating elements. If the relief system is used in conjunction with the vessel of FIGURE 1, for production of phthalic anhydride, the magnitude of the pressure is determined by the pressure at the attachment of bleed line 18 to air line 19 above inlet 11, less the pressure drop between the attachment of these lines and the exhaust 20 of the vessel. In operation the pressure in the chamber above the valves is only 2 or 3 p.s.i. above the normal pressure below the valves. Consequently the valves respond quickly to a sudden pressure rise in the chamber below valves without incurring the risk of ineffective relief of the vessel. Furthermore, the valve of the present invention is adaptable to more stringent applications where it may be necessary to have the chamber pressure independently controlled as by connecting the chamber to a separate source through a variable valve system. It is noted that in a separately controlled relief pressure system, the pressure within chamber 32 may be easily varied as process operating criteria occur. Hence flexibility of the system is achieved without loss in operational reliability. In both modifications however it should also be noted that the chamber above the valves will be effective to attenuate the noise created by the release of pressure from the interior of the vessel. As a consequence, personnel working adjacent to the conversion vessel will be less likely to be startled as the relief valves open to relieve the vessel.

A further feature of the relief system is the high exhaust capacity instantaneously available to dissipate pressure from the vessel 10. The capacity of the system is achieved by the increased flow area of the relief system provided by the series of spherical valves 31, each of which instantaneously opens to exhaust the explosion-created pressure wave from the vessel. It is noted that the diameter of each spherical ball is directly related to the area available to exhaust the vessel but has an upper limitation in that the diameter may not be greater than 10 inches. This is required if the sphere is to have the lightness and mechanical ruggedness needed for effective relief systems.

Tests have been performed to show the reaction and recovery sensitivities of the valving system in accordance with the invention. In these tests a single spherical relief valve was located in a model vessel and exposed to pressure waves created by the explosion of orthoxylene-air mixtures burning at rates from .06 to .1 second. The results of the test are set out in full below:

```
                                              Sec.
Reaction time—Closed to open _____ 0.02
Recovery time—Open to closed _____ <1
```

Inspection of the data illustrates that the spherical relief valve has an exceedingly high reaction time to an incident pressure wave created by an explosion as well as a quick recovery to normal closed position in contact with the seat element of the valve after the explosive wave has been dissipated.

MODIFICATION

Refinery operations often require that the pressure medium above the relief system be completely isolated from the interior of the vessel undergoing intermittent explosions. Such a requirement is usual where the pressure medium above the spheres does not form an integral part of the production process, or where small amounts of the pressure medium leaking into the vessel can upset the conversion balance. For such applications, it is desirable to provide a relief system not only for an ultrafast response and recovery sensitivities but also having means of isolating the interior of the vessel from the pressure medium above the valve balls of the relief system.

Figure 6:
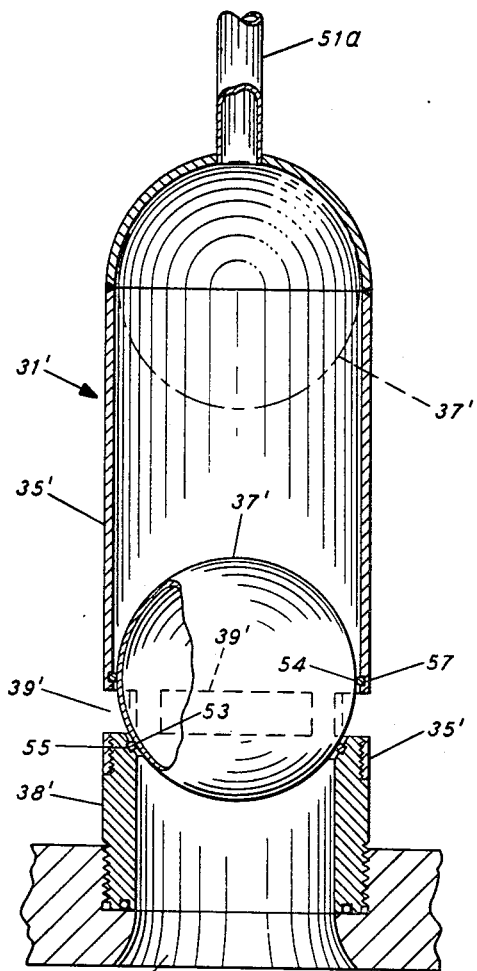
FIGURE 6 is an enlarged detail drawing of a modified spherical relief valve of the relief system used in the process of FIGURE 5.
Figure 5:
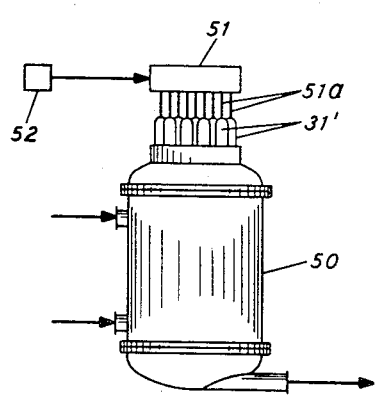
FIGURE 5 is a flow diagram, partially schematic, of a process in which a modification of the relief valve system of FIGURE 2 is useful.

In FIGURES 5 and 6 a modification of the relief system previously described is shown for preventing the pressure medium above the spherical check valves from leaking into vessel 50. The relief system includes a series of modified spherical valves 31' connected through manifold 51 to a source of air pressure, usually a blower 52. The purpose of manifold 51 and separate feed lines 51$a$ connected to the valves is to separately pressurize each valve independent of the operating pressure of the vessel. Referring now to FIGURE 6, each valve includes a ball cage 35' threadably attached to the head of the vessel in alignment with an opening 36'. The ball cage acts as a guide for sphere 37' and is provided with a series of slots 39' for exhausting the pressure wave to the atmosphere exterior of the vessel. Sphere 37' is adapted to seat on annular seating element 38' in simultaneous contact with both a first O-ring 53 supported in the seating element and a second O-ring 54 disposed in the side wall of valve cage 35'. First O-ring 53 is supported in groove 55 in the seating element below slots 39' and is brought into pressure-sealing contact with an exterior portion of sphere 37'. Second O-ring 54 is supported in groove 57 formed in the side wall of valve cage 35' above slots 39' also contacting the exterior of sphere 37' at a location above first O-ring 53. The second O-ring 54 forms a check seal with the sphere along a surface defining a plane passing through the center of formation of the valve ball.

While other sealing configurations can be used, a configuration in which the diameter of O-ring 53 and groove 55 are smaller than the O-ring 54 and the groove 57 is preferred. It is apparent that the smaller area exposed to the interior pressure of the vessel when O-ring 53 is in contact with sphere 37', will allow operation of the relief system even though the differential operating pressure between the vessel and ball cage 35' is zero. Consequently connecting the interior of the vessel to the manifold above each valve, as for example, by a bleed line, will allow satisfactory operation of the system. Aside from the advantage of lower fabrication and maintenance cost, the operation of the system in this manner will also be self-regulating. That is, changes in the operating pressure within the vessel will be automatically reflected at the manifold. Consequently, if the operating pressure of the process is changed during the process run, the differential pressure between the interior of the vessel and each valve remains constant irrespective of the magnitude of the change in operating pressure.

The valve pictured in FIGURE 6 may have application apart from vessel 50. For example, a valve or a series of valves may be attached to relief ports to relieve storage tanks or pipe lines if ultrafast relieving action, self-regulation and self-recovery are required in these applications. However, the valve of FIGURE 6 cannot operate in all environments. The operating temperatures of the pressure medium above and below the O-rings 53 and 54 must be within the operating capabilities of the material forming the O-rings. Otherwise if the temperatures are too high, deterioration of seals between the O-rings and the valve ball occur over the operational cycle of the valve.

While certain preferred embodiments of the invention have been specifically disclosed, it should be understood that the invention is not limited thereto as many variations will be readily apparent to those skilled in the art and the invention is to be given its broadest possible interpretation within the terms of the following claim.

What is claimed is:

1. In a relief system for an explosion-prone vessel having a head, at least one inlet and one outlet, a central reaction zone and at least one reactant within said zone, the combination of support means having a series of openings therethrough in operative contact with said central reaction zone, a plurality of spherical relief valves attached to said support means in cooperative alignment with said openings, each of said valves including a cylindrical valve cage in alignment with one of said openings, a separate seating element attached within each of said openings wherein said valve cage and said seating element have surfaces in cooperating contact within said opening, a hollow sphere slidable within said valve cage and having a first arcuate portion in operable contact with said seating element to provide a seal and a second arcuate portion remote therefrom, and a source of pressurized gas controllably connected to each of said valves for providing gas pressure over said second portion of said sphere to maintain a substantially constant pressure differential between said first and second portions of said sphere and maintain said sphere in contact with said seating element except in response to explosion-created increases in pressure in said reaction zone of said vessel.

References Cited

UNITED STATES PATENTS

| | | | |
|---|---|---|---|
| 1,054,794 | 3/1913 | Riegel | 137—512 |
| 1,211,283 | 1/1917 | Butler | 137—533.13 X |
| 1,666,962 | 4/1928 | Dennis et al. | 137—533.13 X |
| 2,292,946 | 8/1942 | Karig | 165—11 X |
| 2,770,255 | 11/1956 | Goddard | 137—529 |

OTHER REFERENCES

Glattli, Three-Terminal Ball Elements, IBM Technical Disclosure Bulletin, vol. 6, No. 2, p. 28, July 1963.

WILLIAM F. O'DEA, Primary Examiner.

D. J. ZOBKIW, Assistant Examiner.

U.S. Cl. X.R.

137—533.21, 539, 543.19